US006317464B1

United States Patent
Le et al.

(10) Patent No.: US 6,317,464 B1
(45) Date of Patent: Nov. 13, 2001

(54) METHOD AND APPARATUS FOR SEPARATING DIGITAL DATA SIGNALS FROM ANALOG VOICE SIGNALS TRANSPORTED OVER A COMMON CONDUCTOR

(75) Inventors: Minh Le, Ottawa; Gyula Jakab, Nepean, both of (CA)

(73) Assignee: Nortel Networks Limited, St-Laurent (CA)

( * ) Notice: Subject to any disclaimer, the term of this patent is extended or adjusted under 35 U.S.C. 154(b) by 0 days.

(21) Appl. No.: 09/093,401

(22) Filed: Jun. 9, 1998

(51) Int. Cl.[7] ........................................................ H04B 3/00
(52) U.S. Cl. .......................................... 375/257; 375/258
(58) Field of Search ...................................... 375/256, 257, 375/258, 219, 220; 379/93.05, 93.07, 394, 398, 399; 340/310.05; 333/177, 24 R, 25, 26, 109

(56) References Cited

U.S. PATENT DOCUMENTS

| | | | |
|---|---|---|---|
| 5,515,433 | * | 5/1996 | Chen .................................... 379/398 |
| 5,528,630 | * | 6/1996 | Ashley et al. ....................... 375/258 |
| 5,579,336 | * | 11/1996 | Fitzgerald et al. ................... 375/219 |
| 5,838,722 | * | 11/1998 | Consi ................................. 375/219 |
| 5,841,841 | * | 11/1998 | Dodds et al. ..................... 379/93.08 |
| 5,896,417 | * | 4/1999 | Lau ..................................... 375/258 |
| 6,067,316 | * | 5/2000 | Amrany et al. ..................... 375/220 |
| 6,078,613 | * | 6/2000 | Bingel ................................ 375/220 |
| 6,104,707 | * | 8/2000 | Abraham ............................ 370/295 |
| 6,163,579 | * | 12/2000 | Harrington et al. ................. 375/257 |

* cited by examiner

Primary Examiner—Chi Pham
Assistant Examiner—Emmanuel Bayard

(57) ABSTRACT

The present invention relates to a method and apparatus for separating a low frequency voice signal from a high frequency data signal propagating on an analog loop connecting the central office of the PSTN to a CPE. The apparatus includes a low pass filter connected in series with the tip and ring conductors of the analog loop to extract the voice signal. The apparatus also includes a high pass filter to reject the low frequency voice signal, leaving only the higher frequency components. The high pass filter features a transformer including two balanced primary winding sections, one section being in series with the tip conductor and one section being in series with the ring conductor. A junction circuit is coupled to the high pass filter to provide the signal exchange functionality needed to separate the transmit and receive components of the high speed data signal. The junction circuit includes a transmit component output coupled to a secondary winding section of the transformer for passing the transmit component applied to a transmit component input of the junction circuit to the analog loop through the transformer of the high pass filter. The junction circuit also includes a composite signal input for receiving a composite signal from a second section of the secondary winding that is a combination of the transmit component and the receive component. A processing circuit in the junction circuit extracts the receive component by canceling the transmit component in the composite signal.

23 Claims, 2 Drawing Sheets

METHOD AND APPARATUS FOR SEPARATING DIGITAL DATA SIGNALS FROM ANALOG VOICE SIGNALS TRANSPORTED OVER A COMMON CONDUCTOR

FIELD OF THE INVENTION

The present invention relates to the field of data transmission. More specifically, it pertains to a method and a device for transmitting digital data signals over analog channels in telecommunication networks, for instance the analog loop connecting the central office of the Public Switched Telephone Network (PSTN) to the subscribers' Customer Premises Equipment (CPE).

BACKGROUND OF THE INVENTION

With the arrival and expansion of the Information Highway the quantity and speed of data transmission continues to grow. Telephone networks have being slowly converted from an all analog environment to a virtually all-digital network. Within these networks, the trunks and switches have been virtually 100 percent converted, while the local loops leading to the customer remain largely analog, other than in those environments where Integrated Services Digital Network (ISDN) technology has managed to gain a foothold.

This evolution towards a completely digital network brings many advantages, including the ability to provide a broader and more diverse range of services, a less error-prone network, the ability to achieve both physical and logical integration of applications, and an enhanced ability to deliver the higher bandwidth services requested by many customers.

Unfortunately, this deployment of higher bandwidth services must overcome a large issue, notably the fact that the traditional telephone network is designed to transport voice and relatively low-speed data, as opposed to high-speed digital data. It has also been designed around the known behavior patterns of typical telephony users, with well-understood calling patterns and hold times. The growth in Internet access has had an important, even negative effect on the ability of the local switching infrastructure to handle the requested load, since most users log on and stay connected much longer that the typical telephone call, which is what the switches were designed to handle.

Solutions to the bandwidth bottleneck problem faced by the telecommunications networks include massive switch capacity retrofits, construction of overlay networks for Internet traffic, as well as schemes designed to limit customers' connect time. A particularly promising solution is of a technological nature, specifically the use of Asymmetric Digital Subscriber Line (ADSL) in the networks' analog local loops. ADSL is a technology that offers the subscribers enormous bandwidth, engineered to overlay the existing analog Plain Old Telephone Service (POTS) and basic rate ISDN service. The term "asymmetric" arises from the fact that the system offers as much as 6 Mbps toward the customer, as compared to 384 Kbps from the customer.

Within traditional telephone networks, a copper loop (or two-conductor cable) connecting the central office and the CPE is used to provide the POTS, whose signals are Voice Frequency (VF) signals in the frequency range of 0–4 KHz. These cables are capable of carrying signals up to several MHz, depending on their length and type. ADSL takes advantage of the unused frequency band above 4 KHz and uses the copper loop as its transmission medium, transporting voice in the traditional 4 KHz channel bandwidth where it has always been, while higher bandwidth digital services are relegated to higher frequency domains.

In order to overlay the existing analog POTS, the ADSL system includes, among others, two circuits: a POTS Splitter circuit and a 2–4 W (2 wire to 4 wire) Hybrid circuit. These two circuits are used to combine and separate the POTS and ADSL signals, and are needed at both the CPE and central office ends of the copper analog loop. Unfortunately, the typical ADSL POTS Splitter and 2–4 W Hybrid circuitry is not only expensive, large and very power inefficient, but also produces important distortion which limits the cable range between CPE and central office in certain cases.

OBJECTS AND STATEMENT OF THE INVENTION

An object of the present invention is to provide a device for separating signals transported over a common conductor.

Another object is to provide a method for separating signals transported over a common conductor.

As embodied and broadly described herein, the invention provides a signal separation device, comprising:

a terminal for coupling to a conductor transporting simultaneously a first and a second signal having different frequency ranges, said second signal being characterized by a transmit component and by a receive component;

a first filter coupled to said terminal for extracting said first signal;

a second filter coupled to said terminal for rejecting said first signal;

a transformer having a first winding and a second winding magnetically coupled to one another, said first winding being electrically coupled to said terminal and forming part of said second filter;

a junction circuit, including:
  a) a transmit component output electrically coupled to said second winding for impressing at said first winding the transmit component of the second signal;
  b) a composite signal input electrically coupled to said second winding for receiving a composite signal being a combination of the transmit component and the receive component of the second signal;
  c) processing means for receiving the transmit component of the second signal and the composite signal and generating the receive component of the second signal;
  d) a receive component output coupled to said processing means for issuing the receive component of the second signal.

In a most preferred embodiment of this invention, the signal separation device as defined above is used in a telephone network environment to split the analog voice signal from a high-speed data signal carried over the analog loop connecting the central office of the PSTN to the CPE. Two such devices are required for each analog loop, one at each end of the loop. Accordingly, one device resides in the central office, while the other resides at the CPE.

Since the analog voice signal and the high-speed data signal reside in different frequency domains they can be separated by filtering. More particularly, the analog voice signal propagating on the analog loop is extracted by a low pass filter while the high-speed digital signal is extracted by a high pass filter.

The signal separation device includes a transformer having two windings, namely a first winding and a second winding. The first winding includes first and second balanced sections connected to the tip and ring conductors of the analog loop, respectively. The first winding forms part of the high pass filter. More specifically, the primary magnetizing inductance of the transformer (resulting from the balanced first and second sections) can be used together with an input capacitance to provide the functionality of a high pass filter. The second winding connects to a junction circuit that acts as a 2–4 W hybrid permitting to separate the receive and the transmit components of the digital high-speed data signal. The terms "receive component" and "transmit component" are relative to one another and indicate components of the signal traveling in opposite directions. The "receive component" is data usually issued from the signal separation device and forwarded toward a remote location, while the "transmit component" is data issued from a remote location and directed toward the signal separation device. In a situation where a signal separation device is placed at each end of an analog loop, the "transmit component" for one of the signal separation devices forms the "receive component" of the other signal separation device, and vice-versa.

Most preferably, the winding of the transformer connecting to the junction circuit (second winding) includes two separate sections. One section is connected to a transmit component output of the junction circuit on which is impressed the transmit component of the second signal. That transmit component is obtained locally through a transmit component input. The transmit component injected at the transmit component input is processed with amplifiers and then presented to the transmit component output of the junction circuit. The magnetic coupling between the first and second windings allows a signal transfer to occur such that the transmit component of the signal is impressed at the first winding and then propagates on the analog loop. In this case the signal propagation path is from the second winding toward the first winding.

The other section of the second winding is electrically coupled to a composite signal input and that signal is a combination of the receive component and the transmit component. The receive component is picked-up by the first winding of the transformer and passed through magnetic coupling to the second winding, more particularly, the section of the winding connected to the receive component input. At the same time the transmit signal impressed at the section of the second winding connected to the transmit component output is communicated to the other section of the second winding (through the inter-winding section magnetic coupling) and thus combined with the receive component to form the composite signal.

The junction circuit includes processing means that uses the transmit component of the signal to extract the receive component from the composite signal. Most preferably, the processing means is a signal subtraction circuit that cancels from the composite signal the transmit component leaving only the receive component. The receive component is then passed to a receive component output of the junction circuit.

The transformer that couples the junction circuit to the terminal connecting with the analog loop also forms part of a high pass filter allowing to extract the receive component of the signals presented at the terminal. This feature is highly advantageous because the sharing of the transformer between the junction circuit and the high pass filter avoids the necessity of using an inductor in the junction circuit to cancel out any magnetizing primary inductance within the junction circuit. Prior art devices rely on magnetic coupling between the high pass filter and the junction circuit, in practice realized by introducing between the high pass filter and the junction circuit a dedicated transformer. As this dedicated transformer is a component of the prior art junction circuit, these circuits also require an inductor, known to cause harmonic and inter-modulation distortions, to cancel out the magnetizing primary inductance of the dedicated transformer. If the high pass filter also uses a transformer, then this prior art circuit configuration consists in two transformers connected to one another.

In the present case, the undesirable magnetic coupling mentioned above is avoided and the transmit component output and the composite signal input are electrically connected to the transformer of the high pass filter.

As embodied and broadly described herein, the invention also provides a method for processing signals, comprising the steps of:

providing a terminal for coupling to a conductor transporting simultaneously a first and a second signal having different frequency ranges, said second signal being characterized by a transmit component and by a receive component;

providing a first filter coupled to said terminal for extracting said first signal;

providing a second filter coupled to said terminal for rejecting said first signal;

providing a transformer having a first winding and a second winding magnetically coupled to one another, said first winding being electrically coupled to said terminal, said transformer forming part of said second filter;

providing a junction circuit, including:
  a) a transmit component output electrically coupled to said second winding for impressing at said first winding the transmit component of the second signal;
  b) a composite signal input electrically coupled to said second winding for receiving a composite signal being a combination of the transmit component and the receive component of the second signal;

said method comprising the step of receiving the transmit component of the second signal and the composite signal and generating the receive component of the second signal.

As embodied and broadly described herein, the invention also provides a signal processing device for separating a low frequency voice signal from a high frequency data signal traveling on an analog loop of a telephone network, the high frequency data signal having a transmit component and a receive component, the analog loop having a tip conductor and a ring conductor, said signal processing device comprising:

a tip terminal for coupling to the tip conductor of the analog loop;

a ring terminal for coupling to the ring conductor of the analog loop;

a first filter coupled to said terminal for extracting said first signal;

a second filter coupled to said terminal for rejecting said first signal, said second filter including a transformer having a first winding and a second winding magnetically coupled to one another, said first winding including a first section and a second section, the first section of said first winding being coupled to said tip terminal and the second section of said first winding being coupled to said ring terminal;

a junction circuit, including:
  a) a transmit component output coupled to said second winding for impressing at said first winding the transmit component of the second signal;
  b) a composite signal input coupled to said second winding for receiving a composite signal being a combination of the transmit component and the receive component of the second signal;
  c) processing means for receiving the transmit component of the second signal and the composite signal and generating the receive component of the second signal;
  d) a receive component output coupled to said processing means for issuing the receive component of the second signal.

DESCRIPTION OF A PREFERRED EMBODIMENTS

Figure 1:
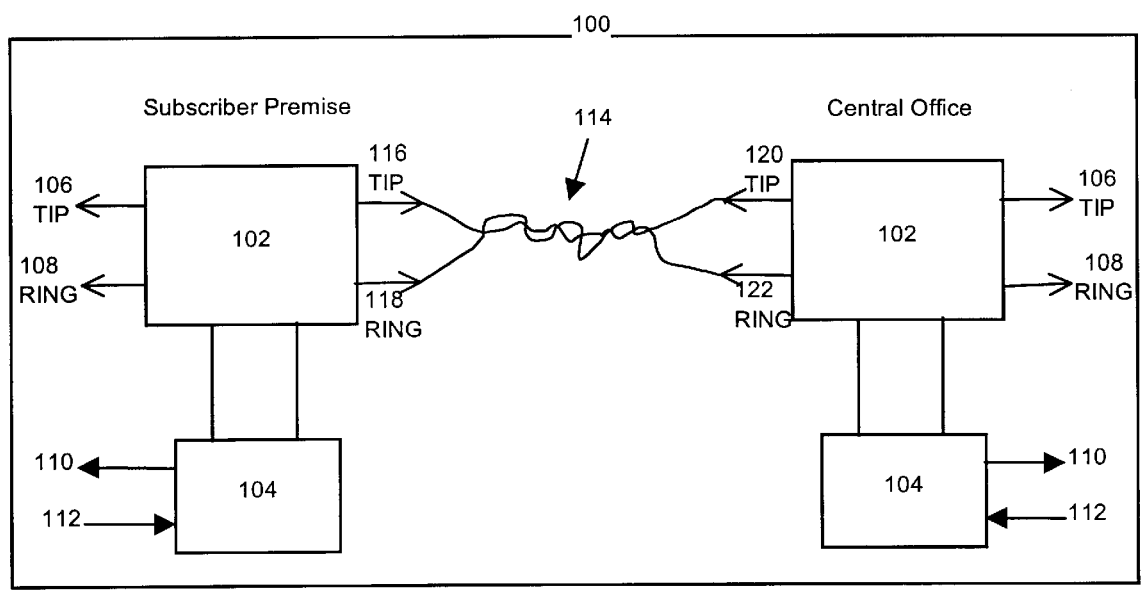
FIG. 1 is a block diagram of a of signal separation device in a communications network, in accordance with this invention.

The present invention provides a method and a device for digital data transmission, specifically signal splitting within high-performance transmission systems. The invention is particularly useful in telephony applications, such as the ADSL system, in order to overlay the existing analog POTS currently provided on a loop connecting the central office of the PSTN to a particular CPE, all the while reducing the cost, size, distortion and power loss which are characteristic of traditional designs. FIG. 1 is a simple block diagram of a most preferred embodiment of the invention, where the telephone network 100 connects a telephone subscriber CPE to the central office via the copper loop (two-conductor cable) 114, and offers to the subscriber both POTS and ADSL service. The signal separation device according to this invention features the functional blocks 102 and 104, which form the signal splitting circuitry necessary to separate and combine POTS and ADSL signals. As shown in FIG. 1, this circuitry is used at both ends of the copper loop 114, and is usually identical in design at both ends.

The signal splitting circuitry is made up of the combination of two circuits: a POTS Splitter circuit 102 which separates the low frequency VF signals from the high frequency ADSL signals, and a junction circuit in the form f a 2–4 W hybrid circuit 104 which separates the oppositely directed components (receive component and the transmit component) of the high speed data signal on the cable 114 so that each can be processed separately. The "2–4 W" expression refers to the fact that the hybrid circuit 104 allows the two-wire copper loop 114 to be connected to wires 110 and 112, in addition to wires 106 and 108, forming a two wire to four wire connection. Traditionally, the two conductors of the copper loop used to connect the subscriber CPE to the central office are referred to as the TIP and RING, where the TIP has end nodes 116 and 120, and the RING has end nodes 118 and 122. The TIP and RING provide Plain Old Telephone Service (analog transmission) via nodes 106 and 108, respectively, at both the subscriber premise and the central office. ADSL service (digital transmission) is provided, via the 2–4 W hybrid circuit, over links 110 and 112. Link 110 is used for receiving ADSL signals sent over cable 114, while link 112 is used to transmit ADSL signals over cable 114.

Figure 2:
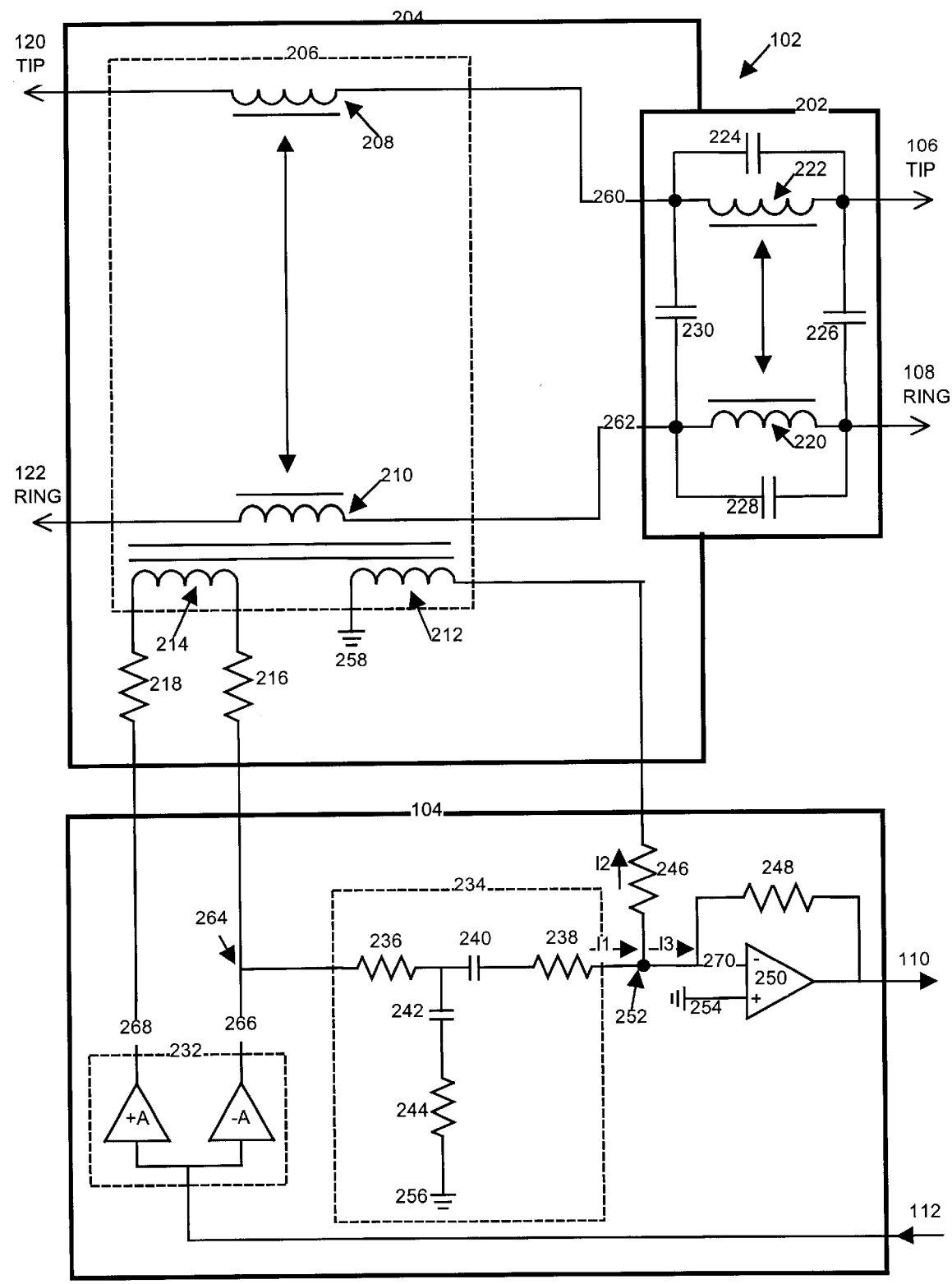
FIG. 2 is a detailed circuit diagram of the signal separation device depicted in FIG. 1.

FIG. 2 is a detailed circuit diagram of the signal-. separation device installed at the central office end of the telephone network, where normally a plurality of such devices would exist, each device servicing a single analog loop. As mentioned earlier, each signal separating device includes two functional blocks 102 and 104. The POTS Splitter 102 is comprised of a Low Pass Filter (LPF) 202 and a High Pass Filter (HPF) 204, where the HPF 204 itself comprises the coupling transformer 206, the input capacitor 230 and the terminating resistors 218 and 216. The 2–4 W Hybrid 104 is comprised of the balanced amplifiers 232, a high impedance balance network 234, the resistors 246 and 248, and the amplifier 250.

The LPF 202 is inserted in series with the TIP 106 and RING 108 conductors on the POTS service side of the telephone network. The LPF 202 is a passive, balanced $3^{rd}$ order inverse Chebyshev design, consisting of a transformer (formed by the primary winding including sections 220 and 222 magnetically coupled to one another, section 222 being in series with the TIP 106 conductor while section 220 is in series with RING 108 conductor) and capacitors 224, 226, 228 and 230. The pass band of the LPF 202 is typically from 0 to 10 kHz. Such a filter design is well known to those who are skilled in the art, and will not be described in more detail. Alternative types of low pass filters, as well as alternative filter orders, may be used for this invention.

The coupling transformer 206 is connected in series with the TIP 120 and RING 122 conductors on the cable 114 side of the telephone network, and comprises a primary winding including a first section 208 and a second section 210, connected in series with the TIP and RING conductors, respectively. The sections 208 and 210 are balanced. The transformer 206 also comprises a secondary winding including a first section 212 and a second section 214. Terminal 260 of the LPF 202 is connected to one end of the first section of primary winding 208 of the transformer 206, while terminal 262 of the LPF 202 is connected to one end of the second section of the primary winding 210 of the transformer 206. The other ends of primary windings 208 and 210 are connected to the TIP 120 and RING 122 terminals, respectively.

By connecting the transformer 206 in series with the analog loop 114, the primary magnetizing inductance of the transformer 206 (resulting from the balanced sections 208 and 210 of the primary windings) can be used together with the input capacitance 230 of LPF 202 in order to implement the required HPF functionality. In a preferred embodiment of this invention, the turn ratio of the full primary winding sections 208 and 210 to either of the secondary winding sections 212 and 214 is 1:1. Alternatively, other turn ratios may also be used to implement the transformer 206 circuitry.

The secondary winding section 214 is used to couple the ADSL transmit signal output (the transmit signal arriving from the balanced amplifiers output terminal 268) to the analog loop 114, as well as to provide a controlled terminating impedance to the analog loop. By attaching one end of the secondary winding section 214 to resistor 216 and the other to resistor 218, this terminating impedance is achieved. In a preferred embodiment of this invention, the sum value of the two resistors 216 and 218 is 100 ohms, so as to match the analog loop 114 characteristic impedance which is typically also 100 ohms. Alternatively, other resistor values can be used for this terminating impedance.

The secondary winding section 212 is used to sense the voltage at the TIP 120 and RING 122 conductors, where one end of the winding 212 is connected to ground 258 and the other to resistor 246. It is the resistor 246 which converts this voltage to a current I2. The value of resistor 246 is high (typically 2.21 Kohms), as compared to the 100 ohms analog loop characteristic impedance, so as to ensure that the transmitter power wasted on this component is negligible.

The HPF component of the POTS Splitter 102 is therefore a balanced filter, formed by the primary magnetizing inductance of transformer 206, input capacitor 230 and the terminating resistors 216 and 218. The filter type and stop band corner frequency are controlled by the value of the primary magnetizing inductance of the transformer 206.

As mentioned above, the 2–4 W Hybrid 104 is used to separate the oppositely directed transmit and receive signals on the analog loop 114 so that each can be processed separately. Specifically, the 2–4 W Hybrid 104 isolates and attenuates the reflected ADSL transmit component, which arrives on transmit component input 112, from the ADSL receive component to be sent over receive component output 110, both of which components propagate on analog loop 114. As described above, a current I2 flows through resistor 246 as a result of the voltage sensed across the TIP 120 and RING 122 conductors of cable 114 by secondary winding component 212 connected to a composite signal input of the 2–4 W hybrid. The composite signal is a combination of the receive component and the transmit component of the high speed data signal. Since the analog loop contains both the transmit and receive ADSL signal components, so will current I2.

The complex balance network 234 is designed to generate a current I1 from the ADSL transmit signal component only, and comprises resistors 236, 238 and 244, and capacitors 240 and 242. The lack of inductive components employed within the balance network 234 eliminates the distortion from which suffer traditional signal splitting circuitry. As the function and design of the balance networks in general has been very well documented and is well known to those who are skilled in the art it is not deemed necessary here to discuss in detail the structure and operation of the balance network 234. Note that current I1 is of the same magnitude but 180 degrees out of phase with the transmit signal component of current I2.

Node 252 is a current summing node, where the two currents I1 and I2 sum together. The result of this summing is that current I3 has no transmit signal component, as current I1 cancels the transmit signal component of current I2. Current I3 feeds into terminal 270 of amplifier 250, which is responsible for outputting the ADSL receive signal on link 110.

The functionality of amplifier 250 is well known to those skilled in the art, and will not be described in more detail.

The ADSL transmit signal which arrives on transmit component input 112 passes through the balanced amplifiers 232. These amplifiers are used to process the transmit component for coupling to the cable 114. The ADSL transmit component which is output from the balanced amplifiers output terminal 266 also branches at junction 264 and feeds into the balance network 234, as required in order to produce current I1. The balanced amplifiers 232 supply the transmit component, which is delivered to the analog loop 114 through terminating resistors 216 and 218 and secondary winding section 214 of transformer 206. In theory, since the sum of terminating resistors 216 and 218 matches the analog loop 114 impedance across TIP 120 and RING 122, and assuming that the balance network 234 and resistor 246 have a very high impedance value and that the transformer 206 has no loss, one half of the transmit power is delivered to the analog loop, while the other half is wasted in resistors 216 and 218. The approximative theoretical power loss in the 2–4 W Hybrid 104 is 3 dB. In practice, the balance network 234 and resistor 248 have a finite value impedance, while the transformer 206 does have a certain amount of loss, resulting in a slightly greater power loss. Typically, the practical power loss in the 2–4 W Hybrid 104 is approximately 4 dB, a significant reduction from the practical 7 dB power loss of current signal splitting circuitry, constituting an important improvement in power efficiency.

The above description of a preferred embodiment under the present invention should not be read in a limitative manner as refinements and variations are possible without departing from the spirit of the invention. The scope of the invention is defined in the appended claims and their equivalents.

What is claimed is:

1. A signal separation device, comprising:
    a terminal for coupling to a conductor transporting simultaneously a first and a second signal having different frequency ranges, the second signal being characterized by a transmit component and by a receive component;
    a first filter coupled to said terminal for extracting the first signal;
    a second filter coupled to said terminal for rejecting the first signal, said second filter including a transformer having a first winding and a second winding magnetically coupled to one another, said first winding being electrically coupled to said terminal;
    a junction circuit, including:
        a) a transmit component output electrically coupled to said second winding for impressing at said first winding the transmit component of the second signal;
        b) a composite signal input separate from said transmit component output, said composite signal input electrically coupled to said second winding for receiving a composite signal being a combination of the transmit component and the receive component of the second signal;
        c) a processing unit for receiving the transmit component of the second signal and the composite signal and generating the receive component of the second signal;
        d) a receive component output coupled to said processing unit for issuing the receive component of the second signal.

2. A signal separation device as defined in claim 1, wherein said first filter is a low pass filter.

3. A signal separation device as defined in claim 2, wherein said low pass filter is a passive filter.

4. A signal separation device as defined in claim 3, wherein said low pass filter is a Chebyshev filter.

5. A signal separation device as defined in claim 3, wherein said low pass filter includes a transformer.

6. A signal separation device as defined in claim 3, wherein said low pass filter includes a capacitor.

7. A signal separation device as defined in claim 2, wherein a pass band of said low pass filter in the range from about 0 kHz to about 10 kHz.

8. A signal separation device as defined in claim 2, wherein said second filter is a high pass filter.

9. A signal separation device as defined in claim 8, wherein said terminal includes a first terminal point and a second terminal point, said first winding including a first section and a second section, the first section of the first winding and the second section of the first winding being balanced.

10. A signal separation device as defined in claim 9, wherein the first section of the first winding and the second section of the first winding are in series with the first terminal point and the second terminal point, respectively.

11. A signal separation device as defined in claim 10, wherein said high pass filter includes a capacitor.

12. A signal separation device as defined in claim 10, wherein said second winding includes a first section and a second section.

13. A signal separation device as defined in claim 12, wherein said transmit component output is electrically coupled to the first section of said second winding, said transmit component output being independent of the second section of said second winding.

14. A signal separation device as defined in claim 13, wherein said composite signal input is electrically coupled to the second section of said second winding, said composite signal input being independent of the first section of said second winding.

15. A signal separation device as defined in claim 14, wherein said processing unit is operative to subtract the transmit component of the second signal from the composite signal to generate the receive component of the second signal.

16. A method for processing signals, comprising the steps of:
- providing a terminal for coupling to a conductor transporting simultaneously a first and a second signal having different frequency ranges, the second signal being characterized by a transmit component and by a receive component;
- providing a first filter coupled to said terminal for extracting the first signal;
- providing a second filter coupled to said terminal for rejecting the first signal;
- providing a transformer having a first winding and a second winding magnetically coupled to one another, said first winding being electrically coupled to said terminal, said transformer forming part of said second filter;
- providing a junction circuit, including:
  a) a transmit component output electrically coupled to said second winding for impressing at said first winding the transmit component of the second signal;
  b) a composite signal input separate from said transmit component output, said composite signal input electrically coupled to said second winding for receiving a composite signal being a combination of the transmit component and the receive component of the second signal;
- said method comprising the step, of receiving the transmit component of the second signal and the composite signal and generating the receive component of the second signal.

17. A signal processing device for separating a low frequency voice signal from a high frequency data signal traveling on an analog loop of a telephone network, the high frequency data signal having a transmit component and a receive component, the analog loop having a tip conductor and a ring conductor, said signal processing device comprising:
- a tip terminal for coupling to the tip conductor of the analog loop;
- a ring terminal for coupling to the ring conductor of the analog loop;
- a first filter coupled to said terminal for extracting the low frequency voice signal;
- a second filter coupled to said terminal for rejecting the low frequency voice signal, said second filter including a transformer having a first winding and a second winding magnetically coupled to one another, each of said first and second windings including a first section and a second section, the first section of said first winding being coupled to said tip terminal and the second section of said first winding being coupled to said ring terminal;
- a junction circuit, including:
  a) a transmit component output coupled to the first section of said second winding, independent of the second section of said second winding, for impressing at said first winding the transmit component of the high frequency data signal;
  b) a composite signal input separate from said transmit component output, said composite signal input coupled to the second section of said second winding, independent of the first section of said second winding, for receiving a composite signal being a combination of the transmit component and the receive component of the high frequency data signal;
  c) a processing unit for receiving the transmit component of the high frequency data signal and the composite signal and generating the receive component of the high frequency data signal;
  d) a receive component output coupled to said processing unit for issuing the receive component of the high frequency data signal.

18. A signal processing device as defined in claim 17, wherein the first component of said first winding and the second component of said first winding are balanced.

19. A signal processing device as defined in claim 18, wherein the first component of said first winding is in series with said tip terminal.

20. A signal processing device as defined in claim 19, wherein the second component of said first winding is in series with said ring terminal.

21. A signal separation device as defined in claim 1, wherein said transformer is characterized by a primary inductance and said first filter is characterized by an input capacitance, said junction circuit including a balance network operative to balance out the primary inductance of said transformer and the input capacitance of said first filter.

22. A signal separation device as defined in claim 21, wherein said balance network consists of resistors and capacitors.

23. A signal separation device, comprising:
- a terminal for coupling to a conductor transporting simultaneously a first and a second signal having different frequency ranges, the second signal being characterized by a transmit component and by a receive component;
- first filter means coupled to said terminal for extracting the first signal;
- second filter means coupled to said terminal for rejecting the first signal, said second filter means including a transformer having a first winding and a second winding magnetically coupled to one another, said first winding being electrically coupled to said terminal;
- a junction circuit, including:
  a) a transmit component output electrically coupled to said second winding for impressing at said first winding the transmit component of the second signal;
  b) a composite signal input separate from said transmit component output, said composite signal input electrically coupled to said second winding for receiving a composite signal being a combination of the transmit component and the receive component of the second signal;
  c) processing means for receiving the transmit component of the second signal and the composite signal and generating the receive component of the second signal;
  d) a receive component output coupled to said processing means for issuing the receive component of the second signal.

* * * * *